UNITED STATES PATENT OFFICE 2,559,022

DRY INFANT FOOD

Jan Lolkema, Hoogezand, Netherlands, assignor to Naamlooze Vennootschap: W. A. Scholten's Chemische Fabrieken, Groningen, Netherlands, a corporation of the Netherlands No Drawing. Application July 19, 1948, Serial No. 39,579. In the Netherlands July 15, 1947

2 Claims. (Cl. 99—83)

It has been proposed to prepare acid milk-porridge for infants by boiling an infant's farinaceous food, such as rice flour, in milk, cooling the mass and by subsequently adding a cooled solution of a mixture of citric acid and a dextrin-maltose preparation, obtained by hydrolysis of starch, as a nutritive sugar. This rather circumstantial method of preparation is necessary because when adding the acid to the hot milk or when heating milk to which the acid has already been added, the milk would coagulate in a rather coarse form. Coarsely coagulated milk cannot be used in nursing bottles and it has the additional disadvantage of separating immediately into an aqueous and a solid phase.

When proceeding in the manner described above a porridge is obtained in which the flocculated milk is dispersed in an extremely fine form, so that it does not separate, and which forms a very suitable infant food.

The invention has for its object a process for preparing a food stuff mainly intended as an infant food which consists in mixing a solid organic acid, milk powder and a cold swelling flour in the absence of appreciable quantities of water.

An organic acid suitable for this purpose is citric acid, but other organic acids which are not injurious to health may also be used. The acid is preferably added in the form of a dry mixture with the nutritive sugar dextrin-maltose, but may also be added in the form of a mixture with another sugar such as, for example, glucose, fructose, saccharose, lactose and the like.

The milk powder used is as a rule whole milk-powder. If, however, it is desired to make a fat-free preparation for special purposes it is also possible to use skim milk powder.

The cold swelling flour is obtained by subjecting a flour suitable for infant's food, for example potato-starch, either treated or not, barley flour, rice flour, wheat flour and the like, to the so-called cold swelling starch process. As the digestibility of starch increases according as its cold swelling power is greater, such a cold swelling flour is extremely suitable as a constituent of infants' food.

The preparation of foodstuffs by means of this cold swelling starch process is described e. g. in Patent No. 2,396,592 and in patent application Serial No. 657,899, both of which describe a cold swelling flour prepared by mixing flour with up to an equal amount of water based upon the weight of the starch, heating and pressing such mixture above the gelatinizing temperature of the so-heated flour preferably at a temperature of 100° C. or higher in a thin layer simultaneously drying said thin layer(s) and thereafter comminuting such product. Very suitable for the present purpose is the product obtained by degrading starch according to the Dutch patent application 120,076 by means of a small amount of hydrogen-peroxide in an approximately neutral medium and by subsequently making the resulting product cold swelling in the manner usual, i. e. by pressing the so-treated starch flour in admixture with water in thin layers at a temperature above the gelatinizing temperature of the peroxide treated starch flour, simultaneously drying said thin layer(s) and thereafter comminuting such product for the manufacture of cold swelling starch.

A preparation containing such a cold swelling flour presents the great advantage that it may be dissolved entirely in cold water without a coarse flocculation occurring and that a porridge is obtained thereby having a similar composition as the porridge described above, which has to be prepared in a much more circumstantial manner. Owing to the fact that a flour is used, which dissolves or swells in cold water, the acid can be already added prior to dissolving the flour, whereby it becomes possible to make a preparation which contains the complete ingredients of the porridge in dry form. If desired the temperature may be slightly raised when dissolving the preparation in water provided that the temperature is such that an undesirable coagulation of the casein does not occur.

The porridge prepared from the preparation according to the invention contains the acidified milk in very finely dispersed condition and has an excellent taste. The presence of dextrin-maltose is favorable because this product—as is known—is a very easily digestible food-ingredient.

The proportion in which the various ingredients are mixed, may vary. A suitable composition, for example, is the following:

11 parts by weight of a dry mixture of maltose-dextrin and about 10% of powdered citric acid, calculated on maltose-dextrin.

30 parts by weight of whole milk-powder.

4 parts by weight of a cold swelling infant's farinaceous food.

In order to make a porridge from the dry mixture thus composed it is stirred up with 200 parts by weight of water, a smooth porridge of good texture being immediately formed.

If desired other substances may be added to the above foodstuff, which improve the taste or smell, such as sugar, flavoring materials or the like.

I claim:

1. A dry infant food comprising milk powder, dextrin-maltose, a solid organic acid in a proportion sufficient to coagulate the casein of the milk powder when the preparation is dissolved in water and approximately 10% of a cold swelling flour taken from the class consisting of flour which has been mixed with up to an equal amount of water and pressed in thin layers at a temperature above the gelatinizing temperature of the so-heated flour of about 100° C. and higher, simultaneously drying said thin layers and thereafter comminuting such product, and a starch treated with hydrogen peroxide in a neutral medium and thereafter pressed in admixture with water in thin layers at elevated temperatures, simultaneously drying said thin layers and thereafter comminuting such product.

2. A dry infant food consisting of approximately 30 parts by weight of whole milk powder, approximately 10 parts by weight of dextrin-maltose, about 1 part by weight of citric acid and approximately 4 parts by weight of a cold swelling flour taken from the class consisting of flour which has been mixed with up to an equal amount of water and pressed in thin layers at a temperature above the gelatinizing temperature of the so-heated flour of about 100° C. and higher, simultaneously drying said thin layers and thereafter comminuting such product, and a starch treated with hydrogen peroxide in a neutral medium and thereafter pressed in admixture with water in thin layers at elevated temperatures, simultaneously drying said thin layers and thereafter comminuting such product.

JAN LOLKEMA.

REFERENCES CITED

The following references are of record in the file of this patent:

UNITED STATES PATENTS

| Number | Name | Date |
| --- | --- | --- |
| 1,990,329 | Johnson et al. | Feb. 5, 1935 |
| 2,257,599 | Frischmuth | Sept. 30, 1941 |

FOREIGN PATENTS

| Number | Country | Date |
| --- | --- | --- |
| 26,568 | Great Britain | 1898 |

OTHER REFERENCES

"Dietotherapy, Clinical Application of Modern Nutrition," by Wohl, W. B. Saunders Company, Philadelphia and London, 1945, pages 489–493.